June 15, 1926.                                          1,589,332
                    S. E. SHEPPARD ET AL
    ELECTRODEPOSITION OF COATINGS COMPRISING RUBBER AND A
                      CELLULOSIC COMPOUND
                      Filed April 7, 1925
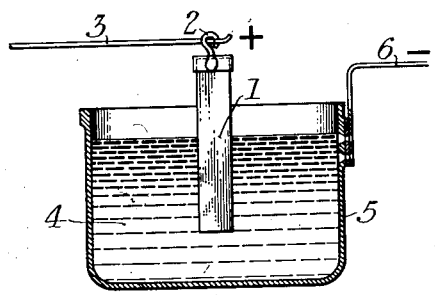
Samuel E. Sheppard &
Leon W. Eberlin,
            INVENTORS,
BY R. L. Stinchfield
            ATTORNEY.

Patented June 15, 1926.

1,589,332

UNITED STATES PATENT OFFICE.

SAMUEL E. SHEPPARD AND LEON W. EBERLIN, OF ROCHESTER, NEW YORK, ASSIGNORS TO EASTMAN KODAK COMPANY, OF ROCHESTER, NEW YORK, A CORPORATION OF NEW YORK.

ELECTRODEPOSITION OF COATINGS COMPRISING RUBBER AND A CELLULOSIC COMPOUND.

Application filed April 7, 1925. Serial No. 21,341.

This invention relates to the electrodeposition of coatings comprising rubber and one or more cellulosic compounds. One object of the invention is to provide a process by which rubber and one or more cellulosic compounds may be quickly and inexpensively deposited simultaneously upon articles having a conducting surface. Another object of the invention is to provide a process in which unvulcanized rubber and a cellulosic compound will be electrodeposited together with a vulcanizing agent, whereby the rubber may be vulcanized after the coating is formed. Other objects will hereinafter appear.

In the accompanying drawing forming a part hereof, the single figure is a diagrammatic cross section of one apparatus which may be employed in carrying out our process.

We have found that useful coatings containing rubber and one or more cellulosic compounds may be electrodeposited upon conducting surfaces of objects when electroconducting emulsions containing rubber and said cellulosic compounds are employed. While this discovery can be utilized in a great many specific ways, we shall give only one of them by way of example, but it will be understood that the invention is not limited to such example, except as indicated in the appended claims.

In general we prefer to first provide separate aqueous emulsions of unvulcanized rubber, of vulcanizing material, such as sulfur, and of cellulosic material. For the rubber emulsion we may employ, such an emulsion as that disclosed in our Patent No. 1,476,-374, granted Dec. 4, 1923, for electrodeposition of rubber coatings. Or we may use rubber latex having about 30% of rubber therein, and preferably stabilized by being made alkaline, say with ammonia for instance.

The sulfur emulsion is readily prepared by mixing 20% of comminuted sulfur, say flowers of sulfur, into a .5% solution of glue in water. The mixture is then given intensive agitation, say in one of the high-speed colloid mills now on the market.

We may prepare the emulsion of one or more cellulosic compounds as follows. For example, 50 parts of cellulose nitrate are dissolved in 150 parts of amyl acetate. One part of a protective colloid, such as glue or gum arabic is mixed, along with 15 parts of an emulgent like Turkey red oil, in 1000 parts of water. The solution of cellulose nitrate in amyl acetate is then thoroughly mixed into the aqueous bath. Finally the mixture is homogenized by intensive agitation, as in any of the well known colloid mills. Instead of nitrocellulose, we may use 50 parts of chloroform-soluble acetate dissolved in 150 parts of chloroform or 50 parts of acetone-soluble cellulose acetate dissolved in 150 parts of acetylene tetrachloride. In the case of cellulose ethers, such as water-insoluble ethyl cellulose, we can dissolve 50 parts in 150 parts of a mixture of equal weights of benzol and ethyl alcohol. Such solutions are stirred into the aqueous bath, containing the colloid and emulgent, and then homogenized in the same way that the solution of nitrocellulose was treated. An emulsion containing nitrocellulose and acetyl cellulose can be prepared by dissolving 25 parts of one and 25 parts of the other together in 150 parts of acetone and then proceeding as above described.

The above described emulsions of unvulcanized rubber, sulfur, and cellulosic compound, are then mixed together and the mixture finally homogenized by running it through a suitable mill. A low-speed disc grinding paint mill is satisfactory.

The mixed emulsion thus produced can be effectively used for electrodeposition and subsequent vulcanization in the way described in our above cited patent. We prefer, however, to provide in the emulsion an accelerator of vulcanization, such as diphenyl guanidine and one or more pigments such as carbon black, nigrosine and zinc oxide. These materials may be mixed into a ½% solution of glue and then homogenized in a colloid mill. We find it convenient to prepare an 8% emulsion of diphenyl guanidine, a 4% emulsion of carbon black, a 2% emulsion of nigrosine, and a 20% emulsion of zinc oxide.

The various emulsions hereinabove described, preferably slightly alkaline in reaction, may be combined in differing proportions. We find the following to be convenient,—4000 parts of a 30% rubber latex, 1000 parts of the sulfur emulsion, 1000 parts of the cellulosic compound emulsion, 1000 parts of the diphenyl guanidine emulsion, 3000 parts of the carbon black emulsion, 500 parts of the nigrosine emulsion and 1000 parts of the zinc oxide emulsion.

The aqueous emulsion thus produced, comprising in its disperse phase electrodepositable unvulcanized rubber, vulcanizing material, cellulosic compound, with or without coloring matter and accelerator may be readily electrodeposited upon conducting surfaces by bringing the latter into contact with the emulsion and passing an effectively unidirectional current through the surface and emulsion at approximately 110 volts, with a current density of about ⅓ of an ampere per square inch.

Referring to the accompanying drawing in which this operation is diagrammatically illustrated, the electroconducting surface 1 to be plated is connected at 2 to the anode line 3, so as to become the anode. It is immersed or otherwise brought into contact with the emulsion 4 which is also connected with suitable cathode. For example, the emulsion may be contained in a metal vessel 5 which is connected with the cathode circuit 6.

When the surface has thereon a coating of the desired thickness, it may be removed from the bath and washed with water, preferably hot water. After drying, the deposit may be vulcanized in any of the customary ways, the sulfur in the deposit acting on the rubber in the usual manner.

It will be noted that the solvent of the cellulosic material in the droplets containing the latter may enter into the deposited coating with the cellulosic compound and tend to coalesce the particles of the latter together. Of course during vulcanizing or during the drying preceding such step, this coalescing agent may be wholly or partially driven off; but it assists the amalgamation of the different elements of the coating prior to vulcanization.

Having thus described our invention, what we claim as new and desire to secure by Letters Patent is:

1. The process of depositing rubber and a cellulosic compound simultaneously onto an electroconducting surface of an object, which comprises the steps of bringing said surface into contact wth an electroconducting emulsion comprising in the disperse phase rubber and a cellulosic compound and passing a depositing electric current through said surface and emulsion.

2. The process of depositing rubber, vulcanizing material, and a cellulosic compound onto an electroconducting surface of an object, which comprises the steps of bringing said surface into contact with an aqueous electroconducting emulsion containing in the disperse phase unvulcanized rubber, vulcanizing material, and a cellulosic compound and passing an effectively unidirectional depositing electric current through said surface and emulsion.

3. The process of despositing rubber, vulcanizing material, a cellulosic compound, canizing material, a coalescing agent therefor, onto and and electroconducting surface of an object, which comprises the steps of bringing said surface into contact with an electroconducting aquoeus emulsion containing in the disperse phase unvulcanized rubber, vulcanizing material, a cellulosic compound, a coalescing agent therefor, and passing an effectively unidirectional depositing electric current through said surface and emulsion.

4. The process of depositing rubber, vulcanizing material, a cellulosic compound, and coloring matter onto an electroconducting surface of an object, which comprises the steps of bringing said surface into contact with an electroconducting aqueous emulsion containing in the disperse phase unvulcanized rubber, vulcanizing material, a cellulosic compound, and coloring matter, and passing an effectively unidirectional depositing electric current through said surface and emulsion.

5. The process of preparing a composition of vulcanized rubber, and a cellulosic compound, which comprises the steps of electrodepositing a mixture of unvulcanized rubber and said cellulosic compound onto an electrode surface from an electroconducting aqueous emulsion containing unvulcanized rubber and said cellulosic compound in the disperse phase, and vulcanizing the deposited rubber in said mixture.

6. The process of preparing a composition of vulcanized rubber and a cellulosic compound, which comprises the steps of electrodepositing a mixture of rubber, vulcanizing material, and said cellulosic compound onto an electrode surface from an electroconducting aqueous emulsion containing in the disperse phase unvulcanized rubber, vulcanizing material and said cellulosic compound, and vulcanizing the deposited rubber in said mixture.

Signed at Rochester, New York, this 2nd day of April 1925.

SAMUEL E. SHEPPARD.
LEON W. EBERLIN.